Patented Sept. 20, 1927.

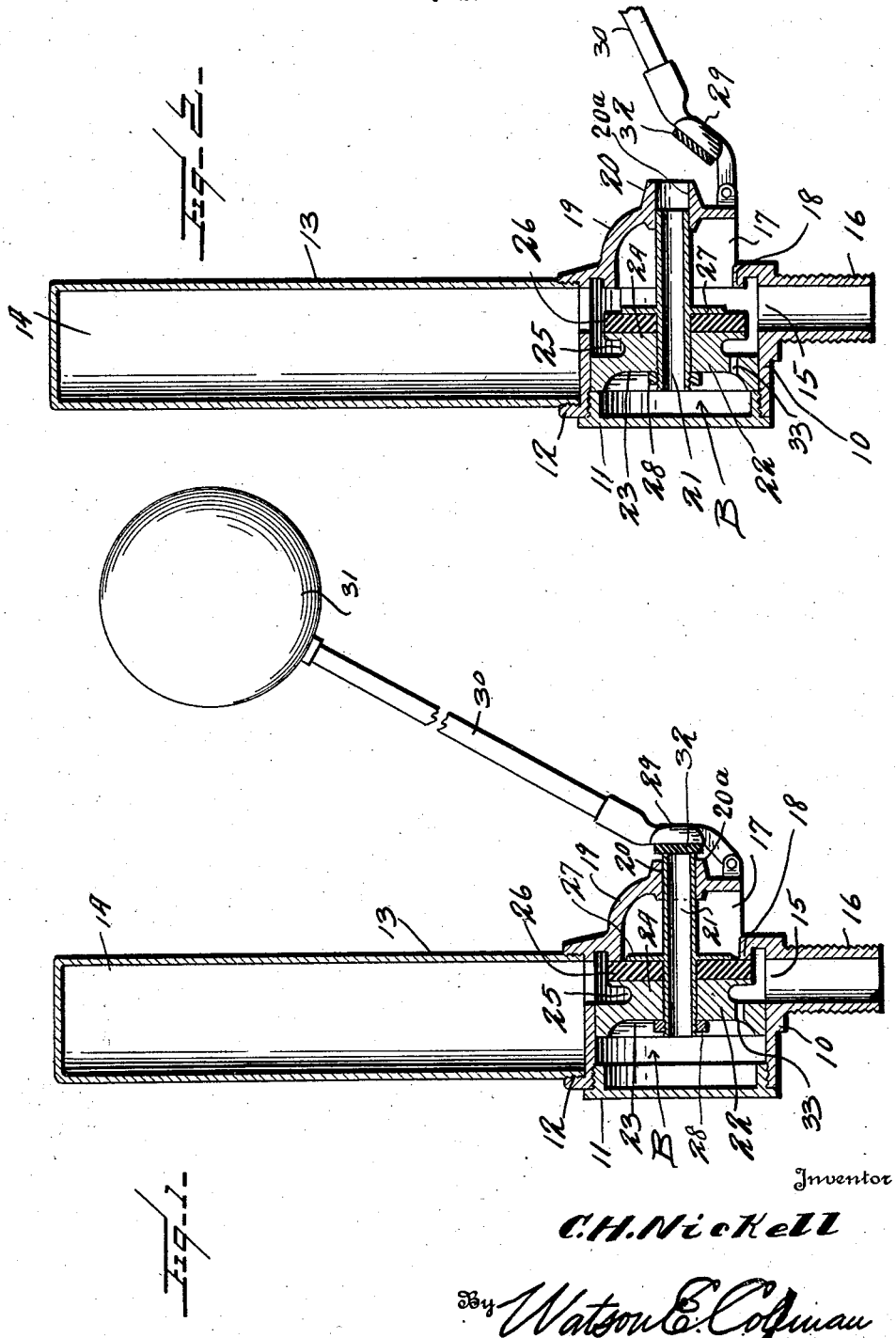

1,643,082

UNITED STATES PATENT OFFICE.

CHARLES H. NICKELL, OF LOS ANGELES, CALIFORNIA.

AUTOMATIC PRESSURE-CONTROLLED VALVE.

Application filed May 27, 1926. Serial No. 112,078.

This invention relates to valves and particularly to pressure controlled valves and the general object of the invention is to provide an inlet valve which will automatically close under variations of pressure on its opposite faces and, therefore, to provide a valve which will automatically open to permit the passage of water when a controlling valve is opened and which is automatically closed when the controlling valve is closed, this inlet valve being actuated or shifted from its opened to its closed position and vice versa by means of differences in water pressure on opposite faces of the controlling piston.

A further object is to provide an air cushioning chamber mounted in conjunction with a valve of this character.

Other objects will appear in the course of the following description.

My invention is illustrated in the accompanying drawings wherein:—

Figure 1 is a vertical sectional view of my improved valve in its closed position;

Fig. 2 is a like view to Figure 1 but showing the valve in its open position.

Referring to these drawings 10 designates a valve body which at one end is interiorly screw-threaded for the reception of the screw-threaded flange of a cap 11. The valve body is also provided with an upwardly extending screw-threaded flange 12 for engagement with the wall 13 of an air cushioning chamber 14. The valve body is formed with the inlet port 15 defined by an exteriorly screw-threaded wall 16 and with a downwardly opening outlet port 17. The valve body is also formed with an annular seat 18 disposed between the inlet port 15 and the outlet port 17.

Between the seat 18 and the outlet port 17 there is a wall 19 of the body which is provided with an aperture 20 and mounted in this aperture is a tubular stem 21. Carried upon this stem is the motor piston 22. This piston has a portion 23 of relatively large diameter and a portion 24 of relatively small diameter, the piston between these two portions being concentrically kerfed as at 25.

The portion 24 carries upon it the rubber packing disk or valve 26 held in place by an annular disk 27. A nut 28 engages the tubular stem 21 and bears against the end of the piston, thus holding the piston and valve upon the tubular stem. The rubber valve 26 is adapted to engage against the seat 18 and when so engaged the passage of water from the inlet port 15 out through the outlet port 17 is prevented. When the piston 22, however, is shifted toward the left as shown in Figure 2, communication is established between these two ports and water can flow into the tank A.

Pivotally mounted upon the body 10 adjacent the opening 20, is a lever formed of a section 29 and an arm 30, carrying a float 31 at its outer end. The member 29 carries upon it the controlling valve disk 32 which is adapted to close against the extremity of the tubular stem 21 and prevent the passage of water through said stem when the float 31 is raised. The larger portion 23 of the valve bears peripherally against the circular wall of the body 10, which circular wall extends partially across the lower end of the air chamber 14. It is to be particularly noted that the stem 21 is of such length that when the piston 22 is in the position shown in Figure 1, and the main valve 26 is closed, the stem 21 projects a very slight distance (in practice about $\frac{1}{16}''$) beyond the extremity of the wall 20$^a$ of the aperture 20, and that when the piston 22 is retracted, as shown in Figure 2, and the valve is opened, the stem 21 is retracted inward of the extremity of the hub or wall 20$^a$. This construction has an important bearing in the operation of the mechanism, as will be now explained.

In the operation of this mechanism the valve 26 is controlled entirely by water pressure. When the float is lowered by water escaping from the tank A, the valve 32 is quickly opened. This permits the escape of water from the chamber B formed between the piston 22 and the cap 11 and this reduces the pressure on this side of the piston, whereupon the water in the inlet pipe 15 passes through a small port 33 into the chamber on the left hand side of the piston, this water passing out through the tubular stem 21. When the pressure in this chamber B is reduced, the pressure against the opposite face of the piston is greater than the pressure in the chamber B and, as a consequence, the piston is shifted to the left, as shown in Figure 2, thus opening the valve 26. Water entering through the port 15 now passes out through the port 17 into the tank and the float rises, carrying the valve 32 into position to close against the end of the wall 20ᵃ. When the control outlet 21 is closed by valve 32, the water pressure on both sides of the piston 22 is equalized and thus the pressure in chamber B, causes the valve to close. The shock of this quick closing valve, however, is taken up or cushioned by the air cushion in the chamber 14.

As before remarked, when the piston 22 is retracted and the main valve opened, the stem 21 is retracted within the annular wall 20ᵃ which defines the opening 20 through which the stem operates and thus when the valve 32 closes, the valve closes against the wall 20ᵃ and not against the extremity of the stem and, therefore, the initial movement of the piston 22 is not impeded by the pressure exerted by the valve 32. The piston 22 may now move forward to the position shown in Figure 1 after the tank has become refilled and just as the valve 26 is about to close against its seat 18, the stem 21 will bear against the valve 32 and the final closing movement of the valve 26 under the action of the piston 22 will slightly depress the float 31 against its own buoyancy. In other constructions known to me of the same general character as mine, the valve carried by the float arm shifts under the action of the float against the end of the main valve stem and tends to shift the main valve rearward or off its seat or hold the main valve from its seat with the main valve opened. With such a construction, therefore, there is a liability of the main valve not closing tightly even when the tank is full, but permitting a slight trickle of water to pass into the tank. This cannot occur with my construction and furthermore this construction does away with the slight "sizzling" noise caused by this leakage.

Preferably the valve 32 and the disk 26 are of rubber or like elastic material to insure a complete closure of the valve and a secure seating of the same. The cap 11 makes a tight chamber B with the exception of the opening 33 and the opening through the tubular stem 21 and the small space between the piston and the wall of the valve chamber.

It will be seen that by this construction large heads of water or gates under any pressure may be controlled by a small valve, for instance; controlling the flow of fluid pressure from the chamber B. Thus I do not wish to be limited to the use of a tubular member 21 which extends through and is carried by the piston 22 as this tubular member, while conveniently mounted in this manner is not necessarily mounted in this manner but this tubular member 21 is the equivalent of a tubular outlet leading from the chamber B at any point and having therein a controlling valve, the equivalent of the valve 32. The controlling valve which is represented by the valve 32 in the embodiment illustrated may be at a distance from the main valve and this valve may be operated either by an automatic operating means as, for instance, by the float 31, or by any other means. While I have illustrated the piston 22 and the valve 26 as operating horizontally I do not wish to be limited to this as it might be operated vertically. When the valve 26 is closed sufficiently for it to set up resistance to the flow of water or other fluid, it can only close as fast as the flow of water through the hole at 33 and by-pass around the piston 22. The leakage of water around the piston 22 may be eliminated by packing when the case demands it. It is necessary to have a quick and complete closing of the outlet pipe 21 whether this be formed as a stem carried by the piston 22 or formed as a direct outlet from the chamber B.

If the outlet through the stem 21 is only partially closed, the pressure in chamber B will build up and the valve 26 will close, leaving a leakage through the pipe 21. Under some circumstances it will be possible to eliminate the air cushion or column 14 and this can be secured by regulating the size of the hole 33 as this will regulate or control the speed of movement of the valve 26 and piston 22. This valve has certain advantages over the ordinary gate valve in that it is perfectly tight. It is very easily and quickly controlled and very simple in construction.

While I have illustrated this device as applied to ball valves and have illustrated certain details of construction yet these details might be varied in many ways without departing from the spirit of the invention as defined in the appended claims.

I claim:—

1. A fluid pressure operated valve comprising a valve body having an inlet port and an outlet port and an annular seat between the two ports, a piston disposed within the valve body to one side of the inlet port and defining with one end of the valve body a chamber within which the piston operates, the piston having a small port leading into said chamber, a tubular stem extending through the piston and carried by and opening through the valve body and moving with the piston, a valve carried on the stem and coacting with the seat, an independently operable controlling valve disposed exteriorly of the valve body and adapted in one position to close the outlet through the tubular stem, and an air cushion chamber extending upward from the valve body and communicating with the interior thereof on the side of the piston opposite to the side which forms one wall of said chamber.

2. A fluid pressure operated valve comprising a valve body having an inlet port and an outlet port and an annular seat between the two ports, a piston disposed within the valve body to one side of the inlet port and defining with one end of the valve body a chamber within which the piston operates, the piston having a small port leading into said chamber, a tubular stem carried by the piston and extending therethrough and projecting forward from the piston, a valve body in advance of the piston having an opening for slidably receiving the forward end of the stem, the wall of which opening projects outward beyond the extremity of the stem and forms an outer valve seat when the piston is retracted, a valve carried on the stem for coacting with the first named seat, and an independently operable float operated controlling valve disposed exteriorly of the valve body and adapted in one position to close against the end of the wall defining the said opening through the valve body.

3. A fluid pressure operated valve comprising a valve body having an inlet port and an outlet port and an annular seat between the two ports, a piston disposed within the valve body to one side of the inlet port and defining with one end of the valve body a chamber within which the piston operates, the piston having a small port leading into said chamber, a tubular stem carried by the piston and extending therethrough and projecting forward from the piston, the valve body in advance of the piston having an opening for slidably receiving the forward end of the stem, the wall of which opening projects outward beyond the extremity of the stem and forms an outer valve seat when the piston is retracted, a valve carried on the stem for coacting with the first named seat, and an independently operable float operated controlling valve disposed exteriorly of the valve body and adapted in one position to close against the end of the wall defining the said opening through the valve body, the tubular stem having such a length that when the first named valve is closed, the stem will project slightly beyond the end of the seat for the second named valve.

In testimony whereof I hereunto affix my signature.

CHARLES H. NICKELL.